United States Patent [19]

Dreyer et al.

[11] Patent Number: 5,352,533
[45] Date of Patent: Oct. 4, 1994

[54] CERAMIC COMPOSITE BODY, PROCESS FOR PRODUCING A CERAMIC COMPOSITE

[75] Inventors: Klaus Dreyer, Essen; Dieter Kassel, Witten; Hans Kolaska, Bottrop, all of Fed. Rep. of Germany

[73] Assignee: Krupp Widia GmbH, Essen, Fed. Rep. of Germany

[21] Appl. No.: 946,307

[22] PCT Filed: May 28, 1991

[86] PCT No.: PCT/EP91/00980
§ 371 Date: Oct. 26, 1992
§ 102(e) Date: Oct. 26, 1992

[87] PCT Pub. No.: WO91/18847
PCT Pub. Date: Dec. 12, 1991

[30] Foreign Application Priority Data

Jun. 1, 1990 [DE] Fed. Rep. of Germany ....... 4017651
Sep. 6, 1990 [DE] Fed. Rep. of Germany ....... 4028217

[51] Int. Cl.$^5$ ............................................. B41M 5/40
[52] U.S. Cl. ................... 428/472; 428/697; 428/698; 428/699; 428/701; 428/702
[58] Field of Search ............... 428/472, 698, 701, 697, 428/699, 702; 501/88, 89, 91, 92

*Primary Examiner*—Archene Turner
*Attorney, Agent, or Firm*—Herbert Dubno; Yuri Kateshov

[57] ABSTRACT

A composite body includes 5 to 40% by mass of SiC whiskers and/or up to 80% by mass SiC lamellae and/or of up to 75% by mass SiC powder, 0.05 to 3% by mass of at least one component selected from the group of $Y_2O_3$, $SiO_3$, MgO, NiO and AlN and/or up to 40% by mass of at least one compound selected from the group of carbides, nitrides or carbonitrides of a metal from one of the Groups IVa, Va, VIa of the Periodic Table of elements, and/or up to 40% by mass of at least one oxide of at least one metal selected from the group which consists of the metals of Group IVa of the Periodic Table of elements, 0.05 to 10% by mass of a metal constituent selected from the group which consists of at least one element selected from the group including nickel, cobalt and iron, and of the group which consists of chromium in an amount up to 25% of the mass of the metal constituent with the balance being at least one element selected from the group which consists of nickel, cobalt and iron, and a minimum of 30% by mass $Al_2O_3$ to the balance of the body.

16 Claims, 4 Drawing Sheets

CERAMIC COMPOSITE BODY WITHOUT METALLIC ADDITIVES REM-PHOTO OF THE WEAR INDENTATION

CERAMIC COMPOSITE BODY WITH 1% Ni REM-PHOTO OF THE WEAR INDENTATION

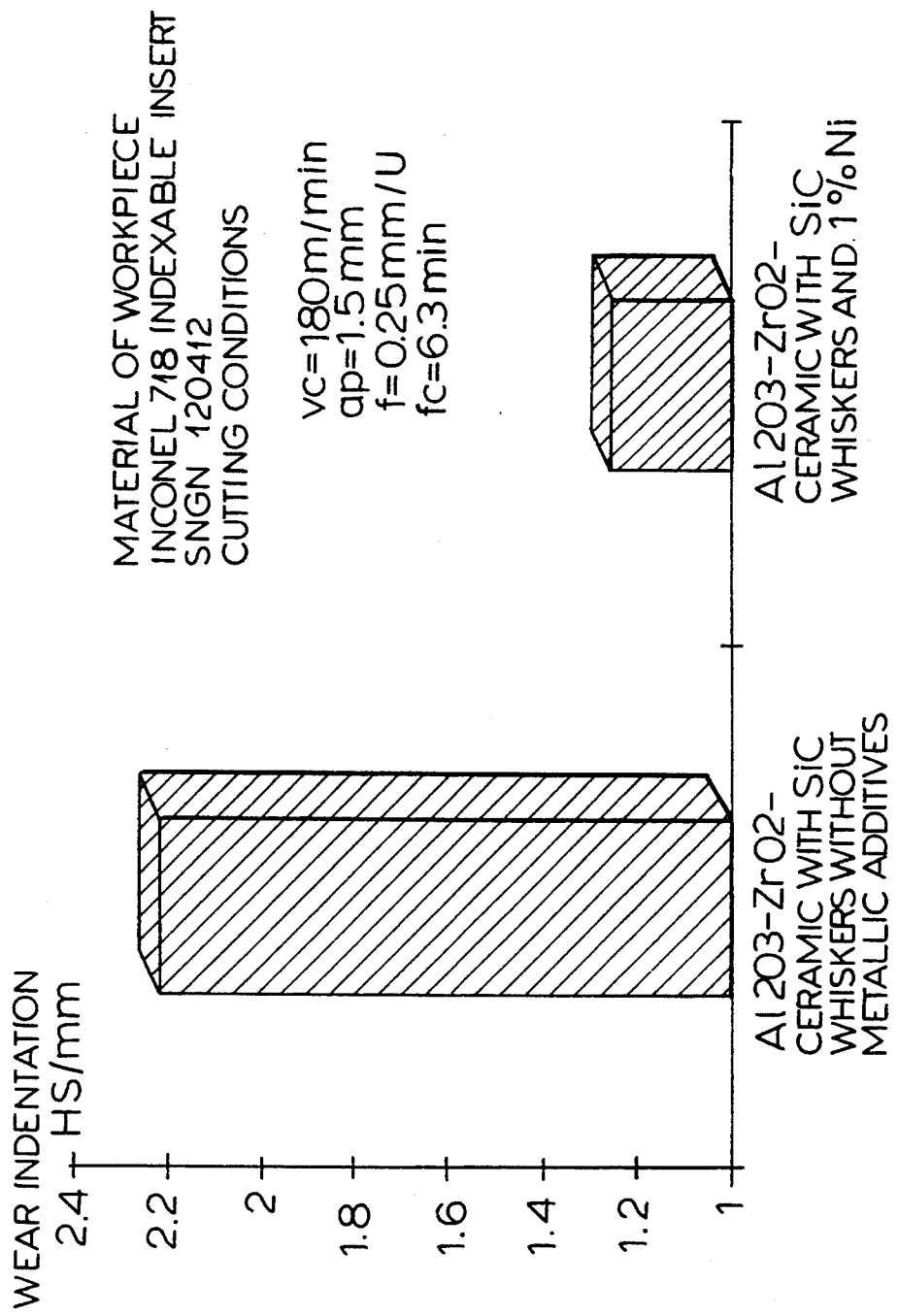

CERAMIC COMPOSITE BODY, PROCESS FOR PRODUCING A CERAMIC COMPOSITE

CROSS REFERENCE TO RELATED APPLICATIONS

This application is a national phase application of PCT/EP91/00980 filed May 28, 1991 and based upon German applications P4017651.7 and P4028217.1 filed Jun. 1, 1990 and Sep. 6, 1990 respectively under the International Convention.

FIELD OF THE INVENTION

The invention relates to a fiber-reinforced ceramic composite body with the following components:
a) 5 to 40% by mass SiC whiskers
b1) 0.05 to 3% by mass $Y_2O_3$, $SiO_2$, MgO, NiO and/or AlN and/or
b2) carbides, nitrides and/or carbonitrides of metals of the Groups IVa, Va or VIa of the periodic table of elements and/or oxides of Group IV of the periodic table of elements up to 40% by mass,
c) the balance being $Al_2O_3$ in a minimal amount of 30% by mass, and
further to a process for the production of a ceramic composite body of the aforementioned kind whereby the initial powders are mixed, wet ground, dried, optionally granulated, subjected to uniaxial or cold isostatic pressing, the resulting composite body being sintered at 1450° C. to 1800° C. and subsequently subjected to hot isostatic supplementary compression (HIP) under a pressure of 5 to approximately 2000 bar.

BACKGROUND OF THE INVENTION

As described in the German publication "ZWF", Zeitschrift für wirtschaftliche Fertigung und Automatisierung, Year 83, Pages 354 to 359, (1988), the efforts for extending the application field of ceramic cutting materials have lately lead to development of ceramic materials on a basis of $Al_2O_3$ reinforced with SiC whiskers. The embedding of SiC whiskers has a positive effect primarily on the mechanical characteristics and the performance when used as a cutting body. Samples containing whiskers are characterized particularly by considerably higher hardness and a higher tenacity and a correspondingly lower breaking risk, when compared with whiskerless samples.

Furthermore, the EP 0 208 910 proposes a fiber-reinforced ceramic material for tools, which has the following components:
(A) 50 to 60% by weight SiC fibers;
(B) 0.1 to 7% by weight of at least one oxide selected from the group consisting of CaO, MgO, $SiO_2$, NiO, $Y_2O_3$, as well as lanthanum dioxide; as well as at least one of the component (C) and (D), whereby
(C) 0.05 to 7% by weight of at least one component selected from a group comprising B, C, AlN, $B_4C$ as well as the borides of Si, Al, Y and Lanthanum, and
(D) 0.05 to 40% by weight of the transition metals pertaining to the Groups IVa, Va, as well as VIa of the periodic table of elements, respectively oxides, carbides, nitrides or borides thereof, including solid solutions of the same, and
(E) the balance being $Al_2O_3$ in an amount no less than 30% by weight.

OBJECTS OF THE INVENTION

It is the object of the present invention to improve the mechanical characteristics of the ceramic composite body. Another object of the invention is to improve the breaking resistance, the bending strength and the resistance to temperature variations of the ceramic composite body.

Yet another object of the present invention is to provide a process capable of achieving the ceramic composite body according to the invention.

SUMMARY OF THE INVENTION

These object are achieved in the fiber-reinforced ceramic composite containing 0.05 to 10% by mass nickel and/or cobalt and/or iron in proportion to the total mass.

Preferably at least 0.4 to 3% by mass of nickel and/or cobalt and/or iron are used.

Comparatively good strength characteristics can be still obtained when up to 25% by mass of the nickel and/or cobalt and/or iron are replaced by chromium.

According to one of the embodiments of the invention, 2% by mass of one or several precious metals can be added to the ceramic composite body. Under precious metals such elements as silver, gold, platinum, iridium, rhodium, rhutenium, palladium and osmium are implied, whereby especially platinum and/or palladium are recommended from the point of view of their sintering characteristics.

According to another embodiment of the invention, the proportion of SiC whiskers in the ceramic composite body of the invention can be replaced completely or partially, preferably up to 80% by mass, by Si lamellae (platelets).

In order to improve the sintering capability, the SiC whiskers and/or monocrystalline Si-lamellae (platelets) can be replaced up to ⅔ of their total mass by an addition of SiC powder.

According to the invention an improvement of the strength characteristics takes place also due to an addition of zirconium or hafnium oxide, respectively silicon nitride, which are embedded in the $Al_2O_3$ matrix and represent 0 to 20% by mass (in proportion to the total mass).

Depending on the intended use, an improvement of the material particularly for machining can be obtained by applying one or more hard surface coatings. These generally known surface coatings consist of oxides, carbides and nitrides and/or carbonitrides of one or more elements of the Groups Ira to VIa of the periodic table of elements and/or $Al_2O_3$ and are applied by the also known CVD and PVD processes.

The process of the invention for producing a ceramic composite body essentially novel feature is hereby the way the includes the steps of sintering and the hot isostatic gas pressure treating (HIP) at one temperature, without intermediate cooling. Due to this combined Sinter/HIP process a uniform structural texture is obtained.

In this process the products according to the invention are preferably sintered under vacuum in an inert-gas atmosphere and subsequently subjected to a gas-pressure treatment in an atmosphere of inert gas, preferably an argon or nitrogen atmosphere. The temperature of the gas-pressure treatment is selected to be either equal to the sintering temperature or lower by up to 100° C.

During the preparation of the mixture it is important to introduce the metallic additives (iron and/or nickel and/or cobalt) in a very fine-grained form and to distribute them homogeneously throughout the mixture. For this purpose the powder mixture is mixed and ground in a drum mill for at least 48 hours with the addition of a grinding liquid. Acetone or i-propanol or preferably water can be used as grinding liquids.

In order to obtain the best possible distribution of the precious metal, the latter is evenly mixed with the other components of the initial powder mixture, in the form of colloidal particles with a crystalline grain size <20 nm.

According to another embodiment of the invention, the precious metal is added as colloidal hydrosol or colloidal lyosol in organic (acetone or i-propanol) solutions or in aqueous solutions.

The application fields of the ceramic composite body according to the invention will be found particularly in bodies under heavy thermal strain in an oxidizing and-/or corrosive atmosphere, such as in motors or gas turbines, or as cutting bodies for the machining process.

The ceramic composite body of the invention with iron additives will be used preferably there where only reduced corrosion resistance is required.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

In a first embodiment example, 88.5% $Al_2O_3$, 10.0% monoclinic $ZrO_2$, 0.5% $SiO_2$, 0.5% MgO and 0.5% Ni - all given data being mass percentages - are mixed in powder form and ground in a drum mill for 48 hours with the addition of water as a grinding medium.

Parallelly thereto the SiC whiskers are subjected to 6 hours of deagglomeration and grinding in water in a drum mill. After deagglomeration the whiskers are sorted by screening for the removal of the coarse parts. The sediment can be further processed after a rest period of approximately 10 hours.

Due to the described combined screening/sedimentation process, the residual agglomerates and overlong whiskers, as well as the very fine parts are removed. What is used is a fraction consisting primarily of whiskers with a length/diameter ratio of approximately 5 to 15. The selected whisker fraction is then both mixed with the previously described matrix fraction in a proportion of 88:17 (matrix:whisker) in an aqueous suspension and homogenized for 2 hours in a drum mill. After that follows the drying in air at approximately 100° C., as well as a subsequent sifting of the dry cake for the preparation of a finished powder mixture which is pressed in graphite molds into large plates with a diameter of e.g. 150 to 300 mm at temperatures of 1300 ° C. to 1800° C. through hot pressing. From these plates various indexable inserts can be worked out.

Instead of the hot pressing used here, it is also possible to alternatively select the combined sinter/HIP process including the steps of:

(a) mixing the ingredients of the composite body, preparing thereby an initial powder;

(b) wet grinding the powder;

(c) thereafter drying and optionally granulating the powder to a dry powder;

(d) thereafter pressing the dry powder, thereby forming a pressed body;

(e) sintering the pressed body in a temperature range from 1450° to 1800° C. to produce a sintered body; and (f) immediately thereafter subjecting the sintered body to hot isostatic densification at a pressure range from 5 to 2000 bar.

As is mentioned before the steps (e) and (f) are conducted without intermediate cooling of the body as opposed to the known methods. However, on average, a temperature during the densification step is approximately lower than the temperature during the sintering step.

Additionally uniformly mixed colloidal particles with a crystalline grain size less than 20 nm of gold, platinum, iridium, rhodium, ruthenium, palladium or osmium are added to the initial powder. The particles are mixed as a colloidal hydrosol or colloidal lyosol in an organic solution which can be either acetone or i-propanol. As an alternative to the organic solution an aqueous solution can be utilized.

Whisker contents used in the process is preferably up to 15% by mass.

Figure 1:
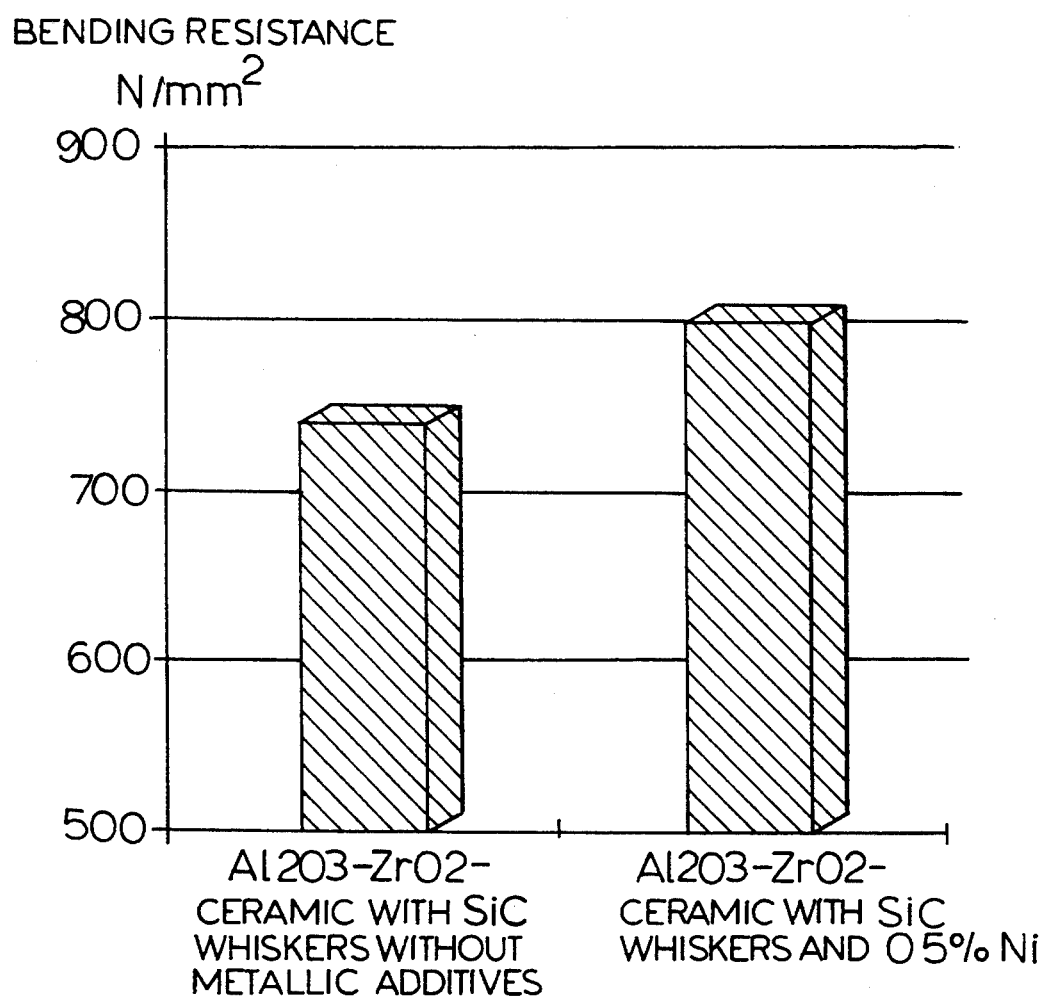
FIG. 1 is the resistance to bending

FIG. 1 shows the bending resistance of a ceramic body based on $Al_2O^3$-$ZrO_2$ with nickel addition, reinforced with SiC whiskers in comparison with a ceramic body without metal components. By adding 0.5% by mass nickel the bending resistance could be increased from 740 N/mm>> to 800 N/mm>>.

Figure 2A:
FIG. 2 is the wear indentation of an alloy according to the invention.
Figure 2B:
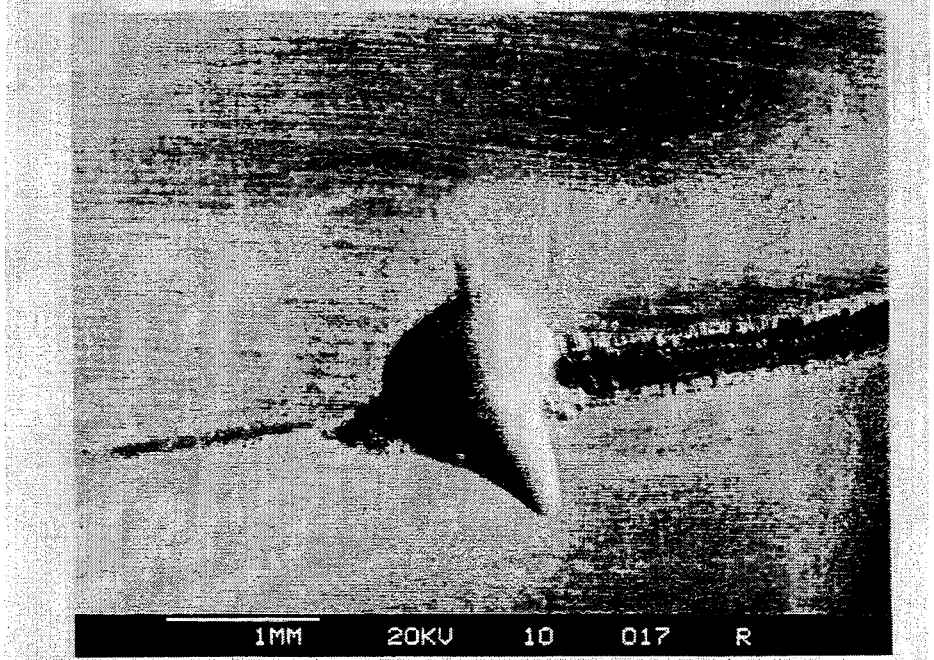

FIG. 2 shows the influence of the nickel addition on the wear resistance of the $Al_2O_3$-$ZrO_3$ ceramic body reinforced with SiC whiskers. At a cutting speed of $V_c$=180 m/min., a cutting depth $a_p$=1.5 mm, an advance f=0.25 mm and a cutting time $t_c$=6.3 min. with the use of a whisker-reinforced ceramic body based on $Al_2O_3$-$ZrO_3$ with a nickel addition of 1%, the wear indentation depth measured on the free surface was lowered from 2.2 mm to 1.3 mm in comparison to a nickel-free whisker reinforced ceramic composite with corresponding composition.

Figure 3:
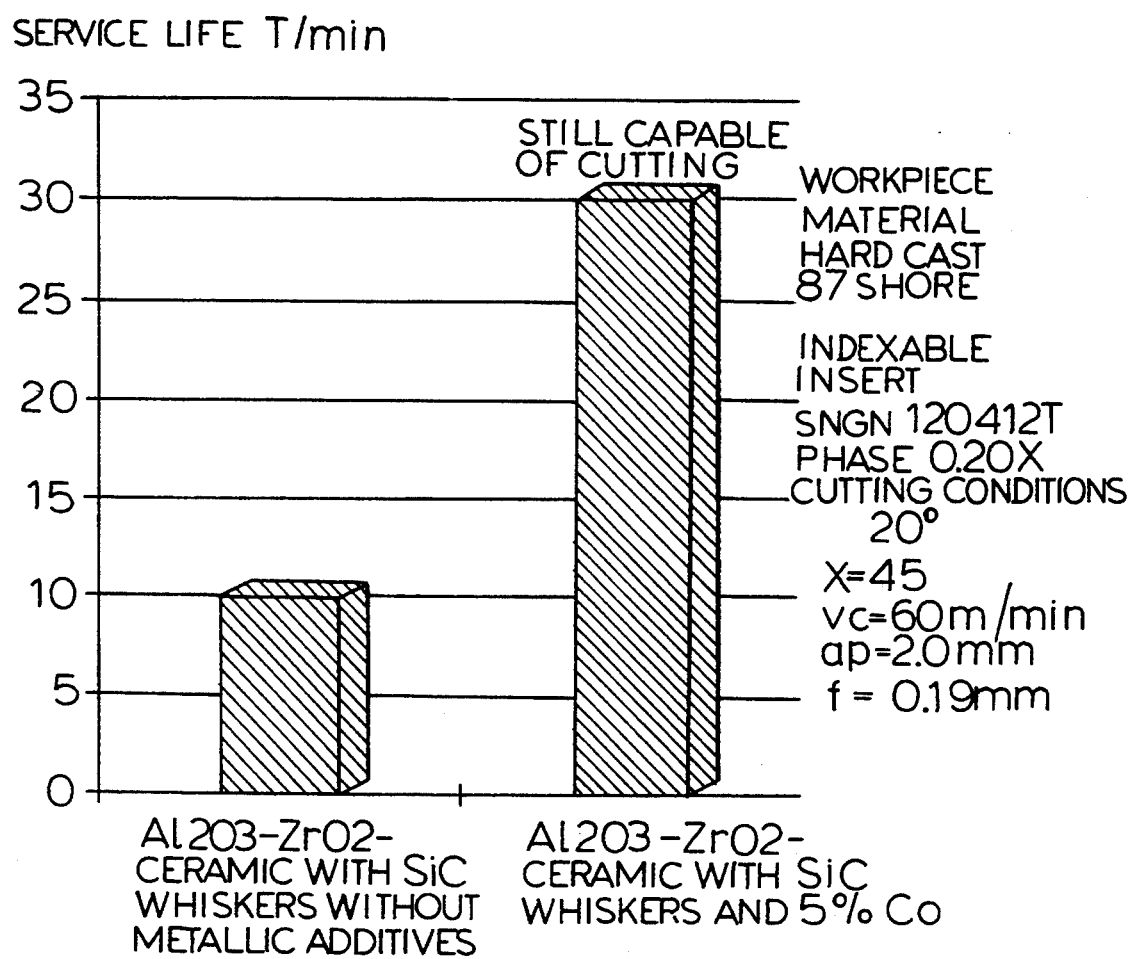
FIG. 3 the service life respectively in comparison with alloys known to the state of the art.

In FIG. 3 an aluminum oxide - zirconium oxide ceramic with SiC whiskers without metallic additives, i.e. without nickel or cobalt or iron is compared with a corresponding ceramic with 0.5 fine grain cobalt. As can be seen from FIG. 3, due to the cobalt addition of 0.5% the service life could be more than tripled. The cutting conditions are indicated in FIG. 3.

The respective ceramics with SiC whiskers involved in the comparisons did not have any metallic parts (Ni, Co, Fe), which increased correspondingly the fraction of the aluminum oxide.

We claim:

1. A fiber-reinforced ceramic composite body consisting of:
   (a) 5 to 40% by mass of a SiC constituent selected from the group which consists of SiC whiskers, of SiC whiskers and up to 80% by mass SiC lamellae, and of SiC whiskers and up to ⅔ of the total SiC mass as SiC powder;
   (b) at least one component selected from the group which consists of components ($b_1$), ($b_2$) and ($b_3$) wherein component ($b_1$) is 0.05 to 3% by mass of at least one compound selected from the group which consists of $Y_2O_3$, $SiO_3$, NgO, NiO and AlN, component ($b_2$) is up to 40% by mass of at least one compound selected from the group which consists of carbides, nitrides or carbonitrides of a metal from one of the Groups IVa, Va, Via of the periodic Table of elements, and component ($b_3$) is up to 40% by mass of at least one oxide of at least one metal selected from the group which consists of the metals of Group IVa of the Periodic Table of elements;

(c) 0.05 to 10% by mass of a metal constituent selected from the group which consists of at least one element selected from the group which consists of nickel, cobalt, iron and chromium in an amount up to 25% of the mass of the metal constituent with the balance being at least one element selected from the group which consists of nickel, cobalt and iron; and (d) a minimum of 30% by mass $Al_2O_3$ to the balance of the body.

2. The composite body defined in claim 1 wherein said at least one element selected from the group which consists of nickel, cobalt and iron is present in an amount of 0.4 to 3% by mass.

3. The composite body defined in claim 1, further comprising up to 2% by mass of an element selected from the group which consists of gold, silver, platinum, iridium, rhodium, ruthenium, palladium and osmium.

4. The composite body defined in claim 1, further comprising up to 20% by mass of at least one compound selected from the group which consists of $ZrO_2$, $HfO_2$ and $Si_3N_4$.

5. The composite body defined in claim 2 wherein at least one surface coating is applied and includes a group consisting of oxides, carbides, nitrides and carbonitrides of at least one element from the group consisting of group IVa, Va and VIa of the periodic table and $Al_2O_3$.

6. A process for producing a ceramic composite body of the following ingredients:

(a) 5 to 40% by mass of a SiC constituent selected from the group which consists of SiC whiskers, of SiC whiskers and up to 80% by mass SiC lamellae, and of SiC whiskers and up to 75% by mass SiC powder;

(b) at least one component selected from the group which consists of components ($b_1$), ($b_2$) and ($b_3$) wherein component ($b_1$) is 0.05 to 3% by mass of at least one compound selected from the group which consists of $Y_2O_3$, $SiO_3$, MgO, NiO and AlN, component ($b_2$) is up to 40% by mass of at least one compound selected from the group which consists of carbides, nitrides or carbonitrides of a metal from one of the Groups IVa, Va, Via of the Periodic Table of elements, and component ($b_3$) is up to 40% by mass of at least one oxide of at least one metal selected from the group which consists of the metals of Group IVa of the Periodic Table of elements;

(c) 0.05 to 10% by mass of a metal constituent selected from the group which consists of at least one element selected from the group which consists of nickel, cobalt and iron, and of the group which consists of chromium in an amount up to 25% of the mass of the metal constituent with the balance being at least one element selected from the group which consists of nickel, cobalt and iron; and (d) a minimum of 30% by mass $Al_2O_3$ to the balance of the body, said process comprising the steps of:

(a) mixing the ingredients of said composite body, preparing thereby an initial powder;

(b) wet grinding said powder;

(c) thereafter drying and optionally granulating said powder to a dry powder;

(d) thereafter pressing said dry powder by uniaxial or isostatic hot pressing, thereby forming a pressed body;

(e) sintering said pressed body in a temperature range from 1450° to 1800° C. to produce a sintered body; and (f) immediately thereafter subjecting said sintered body to hot isostatic densification at a pressure range from 5 to 2000 bar.

7. The process defined in claim 6 wherein said steps (e) and (f) are conducted in an atmosphere of inert gas.

8. The process defined in claim 7 wherein said inert gas is argon or nitrogen.

9. The process defined in claim 6 wherein said steps (e) and (f) are conducted in vacuum.

10. The process defined in claim 6 wherein said step (d) is a hot isostatic pressure step.

11. The process defined in claim 6 wherein said step (d) is an uniaxial pressure step.

12. The process defined in claim 6 wherein said step (f) is conducted at a temperature lying below a temperature at which said step (e) is conducted by approximately 100° C.

13. The process defined in claim 6, further comprising a step of uniformly mixing colloidal particles with a crystalline grain size less than 20 nm of gold, silver, platinum, iridium, rhodium, ruthenium, palladium or osmium with said initial powder.

14. The process defined in claim 13 wherein said particles are mixed as colloidal hydrosol or colloidal lyosol in an organic solution.

15. The process defined in claim 14 wherein said organic solution is acetone or i-propanol.

16. The process defined in claim 13 wherein said particles are a colloidal hydrosol or colloidal lyosol in an aqueous solution.

* * * * *